United States Patent [19]

Bunkoczy et al.

[11] Patent Number: 4,702,969
[45] Date of Patent: Oct. 27, 1987

[54] LAMINATE BONDING METHODS FOR NONFERROUS METALLIC FLUIDIC DEVICES

[75] Inventors: Bela Bunkoczy, Chandler; James A. Wendorff; Walt W. Battin, both of Phoenix, all of Ariz.

[73] Assignee: The Garrett Corporation, Los Angeles, Calif.

[21] Appl. No.: 881,879

[22] Filed: Jul. 2, 1986

Related U.S. Application Data

[63] Continuation-in-part of Ser. No. 736,878, May 22, 1985, abandoned.

[51] Int. Cl.$^4$ .................. B32B 15/20; B32B 15/04; B23K 35/26; B23K 1/20
[52] U.S. Cl. ..................... 428/635; 428/650; 428/642; 428/648; 428/658; 428/660; 228/190; 228/209; 228/263.17; 228/263.21
[58] Field of Search ............... 428/650, 660, 658, 648, 428/635, 596, 935, 939, 674, 654, 636, 642, 647; 228/190, 263.17, 263.21, 208, 209, 210

[56] References Cited

U.S. PATENT DOCUMENTS

| | | | |
|---|---|---|---|
| 2,513,365 | 7/1950 | Rogoff | 428/650 |
| 2,871,886 | 2/1959 | Obrebski et al. | 228/190 |
| 2,995,814 | 8/1961 | Chamness | 428/650 |
| 3,256,071 | 6/1966 | Singleton | 428/650 |
| 3,441,996 | 5/1969 | Boothe | 228/190 |
| 3,555,666 | 1/1971 | Rhee | 29/488 |
| 3,591,917 | 7/1971 | Shira et al. | 29/494 |
| 3,597,658 | 8/1971 | Rivera | 428/650 |
| 3,909,209 | 9/1975 | Kruper et al. | 428/650 |
| 3,981,429 | 9/1976 | Parker | 228/194 |
| 4,467,984 | 8/1984 | Tippetts | 244/78 |

FOREIGN PATENT DOCUMENTS

619279 3/1949 United Kingdom ............... 228/209
939871 10/1963 United Kingdom .

Primary Examiner—John P. Sheehan
Assistant Examiner—John J. Zimmerman
Attorney, Agent, or Firm—R. Steven Linne; Terry L. Miller; Albert J. Miller

[57] ABSTRACT

A laminated aluminum fluidic device is constructed by sequentially coating the facing side surfaces of the aluminum laminae with layers of zinc, nickel and solder, positioning the facing pairs of solder layers in intimate contact, and heating the coated laminae to fuse the facing solder layers.

21 Claims, 4 Drawing Figures

LAMINATE BONDING METHODS FOR NONFERROUS METALLIC FLUIDIC DEVICES

CROSS-REFERENCE TO RELATED APPLICATION

This application is a continuation-in-part of now abandoned U.S. application Ser. No. 736,878 filed on May 22, 1985 and entitled "Laminate Bonding Methods For NonFerrous Metallic Fluidic Devices".

BACKGROUND OF THE INVENTION

The present invention relates generally to metal-joining techniques, and more particularly provides a unique method of bonding the aluminum (or other nonferrous metal) laminae of a fluidic device or the like.

Fluidic devices—those devices which utilize a high velocity fluid jet to perform various sensing or control functions—are customarily formed from a multiplicity of stainless steel laminae which are bonded together by a brazing process. The laminae have various openings formed therein which, in the assembled fluidic device body, collectively define rather intricate internal passages through which the operating fluid is flowed. To bond the stainless steel laminae together the facing surfaces thereof are first coated with a layer of copper-tin plating. The plated laminae are then stacked, in a predetermined aligned relationship, with the copper-tin surfaces of adjacent laminae in intimate contact. The aligned stack is then heated to approximately 1825° F. to fuse the adjacent pairs of copper-tin coatings, thereby bonding the plated laminae into the finished fluidic device.

Because of its lighter weight and lower cost, aluminum is potentially a very desirable alternate laminate material for fluidic devices of the type just described. However, for a variety of reasons, previous attempts to bond thin aluminum fluidic laminae have not resulted in an entirely satisfactory end product. The primary difficulty encountered in applying conventional bonding techniques to aluminum fluidic laminae arises from two design criteria which must be adhered to in manufacturing fluidic devices.

First, the internal fluid passages in the assembled device are extremely sensitive to even minute obstructions. Accordingly, the bonding material cannot be permitted to seep into any of the passages during the bonding process. Secondly, even a small degree of laminae warpage during the bonding process can correspondingly distort the precisely configured passages and seriously diminish the device's overall accuracy.

The first of these design criteria effectively rules out the simple expedient of sweat soldering the stacked aluminum laminae together since it would be extremely difficult, if not impossible, to keep the flowing solder out of the internal fluidic passages, while still obtaining a uniform bond between all surfaces of the intricate laminae. Moreover, the difficulties of soldering aluminum components are well known in the metal-joining art. Specifically, conventional solder materials simply do not adhere well to aluminum surfaces.

The copper-tin plating method used to bond stainless steel laminae is equally unsuitable since the plating material, like conventional solder, does not satisfactorily adhere to aluminum. Additionally, even if such copper-tin plating could be suitably applied to aluminum, its melting point is on the order of 1825° F.—well above the approximately 1140° F. melting point of aluminum. Simply stated, the aluminum laminae would melt before the copper-tin bonding plating could be melted and joined.

Conventional aluminum-to-aluminum bonding techniques such as "cladding" and diffusion bonding have also proven undesirable when applied to fluidic laminae. The cladding method consists of making the aluminum laminae from aluminum sheet having cladding material on its side surfaces which has a melting point (approximately 1000° F.) that is only slightly lower than the 1140° F. melting point of the underlying laminae. The cladded laminae are then positioned in an aligned stack, and the stack is heated to the cladding melting point to fuse the facing cladding layers. This particular process, however, is quite expensive because of the relatively high cost of the cladding material and the long heat up and hold cycle required to achieve the actual bonding. Additionally, warpage of the laminae stack is very difficult to avoid since the 1000° F. cladding melting point is considerably above the approximately 600° F. softening temperature of the aluminum laminae.

Diffusion bonding is another conventional approach to intersecuring aluminum laminae. Under this technique, the uncoated laminae are positioned in face-to-face contact and are subjected, for a predetermined time period, to a sufficiently high temperature and pressure to cause direct aluminum-to-aluminum fusion between the facing laminae. In the fluidics area, however, this bonding method has proven, like the others discussed above, to be less than wholly satisfactory.

First, diffusion bonding of aluminum is both a relatively difficult and time-consuming process. The difficulty arises because the facing aluminum surfaces must be kept from oxidizing before or during the actual diffusion bonding—yet aluminum has the well known propensity for extremely rapid oxidation. To counter this tendency, rather intricate preparation techniques must be employed. Moreover, the time-temperature-pressure interrelationship in the diffusion process must be carefully controlled to prevent warpage of the laminae stack.

More specifically, the diffusion pressure and temperature must be kept at sufficiently low levels to avoid distortion of the stack and its internal passages. With these necessary upper limits on temperature and pressure, the time required to achieve adequate diffusion is greatly increased—in the ordinary instance to several hours for a given laminae stack. This combination of long diffusion "holding periods" and surface preparation difficulties greatly increase the overall manufacturing expense of the fluidic device, thereby rendering diffusion bonding economically unfeasible in most fluidics applications.

From the foregoing it can be seen that a need exists for an aluminum laminate bonding technique which can be economically utilized to accurately produce fluidic devices of the type described. It is accordingly an object of the present invention to provide such a technique.

SUMMARY OF THE INVENTION

In carrying out principles of the present invention, in accordance with a preferred embodiment thereof, an aluminum fluidic device is manufactured by a method comprising the steps of providing a plurality of aluminum laminae each having side surfaces, sequentially coating the side surfaces with zinc, nickel and solder, positioning the solder coatings in intimate contact, and fusing the solder coatings together by heating the coated laminae.

The method of the invention, which is also applicable to other nonferrous metallic laminae such as titanium, eliminates or minimizes the problems and disadvantages commonly associated with conventional metallic laminate bonding methods when applied to aluminum. Since the solder is already in place on the coated laminae before they are heated, solder flow into the internal laminae passages is essentially eliminated. Additionally, the solder's melting point is well below the softening temperature of the aluminum laminae, thereby avoiding the problem of stack and passage warpage. Moreover, since conventional solder material is utilized, which requires a heating time of only a few minutes, the entire bonding process may be inexpensively performed in a relatively short time.

DETAILED DESCRIPTION

Figure 1:
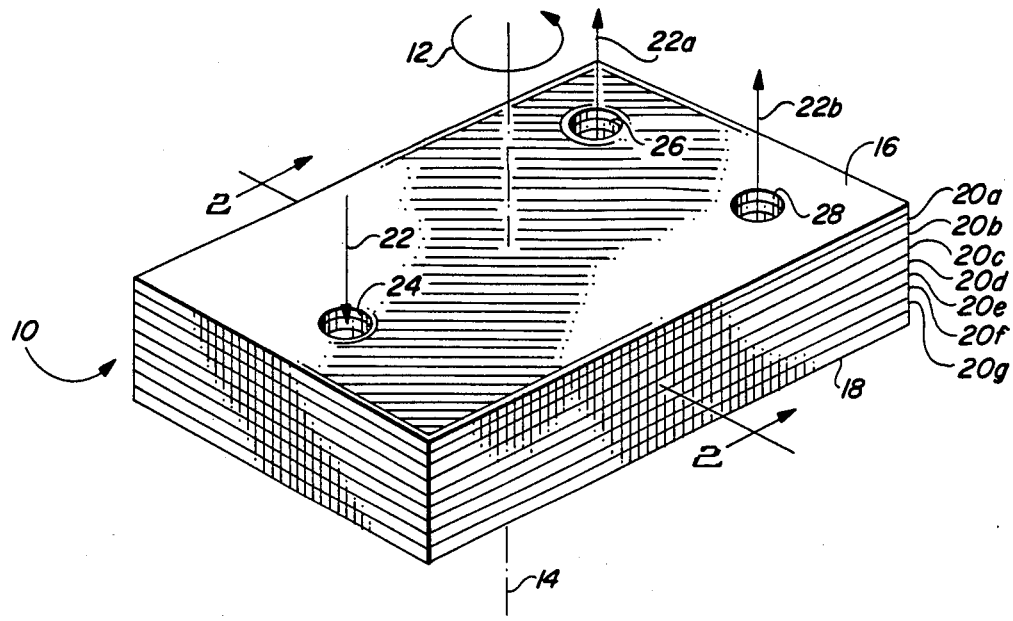
FIG. 1 is a schematic perspective view of a laminated aluminum fluidic device manufactured by a bonding method utilizing principles of the present invention.

Schematically depicted in FIG. 1 is a laminated aluminum fluidic device 10 which is manufactured by a unique bonding method incorporating principles of the present invention. Device 10, representative of a variety of fluidic devices which can be advantageously produced by such method, is an angular rate sensor used to detect the magnitude and sense of angular rotation 12 of the device about a control axis 14 thereof.

The body of rate sensor 10 is formed from a multiplicity of thin, intersecured aluminum laminae, including an upper lamina 16, a lower lamina 18, and a series of intermediate laminae 20a through 20g. During operation of sensor 10, a supply fluid 22 (such as air) is flowed into an inlet opening 24 formed in the upper lamina 16. The intermediate laminae 20a through 20g have formed therein various openings which collectively define an internal passage (not illustrated) within the sensor body.

Within this passage the incoming supply fluid 22 is converted to a high velocity jet which impinges upon, and is divided by, an internal splitter member. The divided jet portions 22a, 22b enter internal receiving passages, each of which communicates with one of two outlet passages 26, 28 which exit the sensor through its upper lamina 16. Jet portions 22a, 22b are respectively discharged through outlets 26, 28 and are indicative of the rate and sense of the angular rotation 12.

More specifically, in the absence of angular rotation the flow rates of jet portions 22a, 22b (and thus the pressures in outlets 26, 28) are equal. However, when the sensor is subjected to rotation about its control axis 14, the internal fluid jet is shifted relative to the splitter due to the Coriolis effect. This, in turn, causes the jet to be unequally divided and results in a pressure differential between the outlets 26, 28, such pressure differential being indicative of both the sense and magnitude of the angular rotation 12.

The operation and general configuration of the representative rate sensor 10 are conventional, and reference is hereby made to U.S. Pat. No. 4,467,984, entitled "Angular Rate Sensing Apparatus And Methods" for a more complete description thereof. However, as previously mentioned, the illustrated sensor is of a laminated aluminum construction, its laminae being intersecured by a unique bonding method which will now be described with reference to FIGS. 2A, 2B and 2C.

Figures 2A, 2B, 2C:
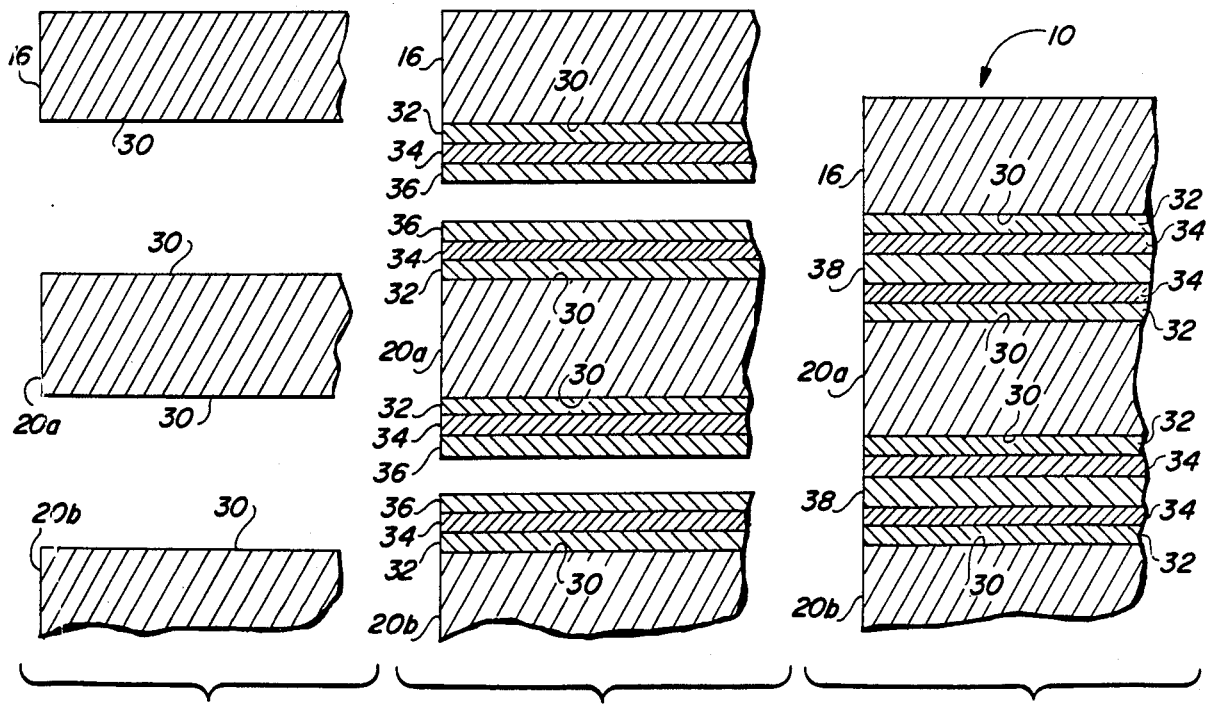
FIGS. 2A, 2B and 2C are greatly enlarged scale fragmentary cross-sectional views taken through the device along line 2—2 thereof, and sequentially illustrate the bonding method.

FIG. 2A illustrates a portion of the upper three laminae 16, 20a and 20b which, in their stacked relationship, have facing side surfaces 30. The first step in the bonding process, as depicted in FIG. 2B, is to zincate the facing aluminum side surfaces 30 by a zinc immersion process resulting in thin zinc coating layers 32 on each of the facing surfaces 30.

A layer of nickel plating 34 (preferably nickel sulfamate), of a thickness of approximately 0.00010 to 0.00015 inch, is then applied to each of the zinc coatings 32. Next, a solder coating 36 is applied to each of the nickel coatings, the coatings 32, 34 collectively defining a coating sub-base readily adherable to aluminum, and to which the solder will readily adhere. This solder coating step is preferably performed by electrodepositing indium, to a thickness of approximately 0.000030 to 0.000060 inch, on the nickel coating using an indium sulfamate plating solution and pure indium anodes.

The final step in the actual bonding process consists of positioning the triple-coated aluminum laminae in a properly aligned, stacked relationship (as indicated in FIG. 2C) with the facing solder coatings in intimate contact. The coated laminae stack is then heated to cause the facing solder coatings 36 to fuse into single, thicker layers of solder 38 (FIG. 2C) to complete the bonding process.

The heating portion of the described bonding process is preferably carried out by utilizing a conventional vapor phase soldering technique in which the aligned laminae stack is exposed to an inert fluorocarbon gas atmosphere at a temperature of approximately 320° F. to 350° F. for approximately ten to twenty minutes to fuse the facing indium layers.

It should be noted at this point that the upper operating temperature limit of the bonded rate sensor 10 is determined by the melting point of the fused solder layers 38—approximately 320° F. to 350° F. in the case of indium solder. In the event that a higher operating temperature limit is desired, tin (having a melting point of approximately 450° F. to 500° F.) can be substituted for indium in the previously described solder coating step. More specifically, such solder coating step would be alternatively performed by electrodepositing tin to a thickness of 0.000050 to 0.000100 inch on the nickel layers 34. The heating step would then be performed by the previously described vapor phase soldering technique, with the exception that the inert gas temperature would be maintained in the range of from approximately 450° F. to approximately 500° F. for the ten to twenty minute holding period.

Depending on the type of solder coatings applied to the laminae, it may be necessary to use a suitable flux in the soldering process. For example, while no flux is required when indium is used, the use of tin as the solder coating medium requires that an appropriate noncorrosive flux be used. If the use of flux is required, it is desirable to subject the bonded sensor to a post-solder cleaning process which comprises placing the sensor in a suitable vapor degreasing atmosphere (such as trichloroethane), draining all the resulting condensate from the internal sensor passages, and then removing any remaining flux using suitable solvents.

From the foregoing, it can be seen that the present invention provides a long-needed method for economically and accurately fabricating laminated aluminum fluidic devices. Importantly, such method eliminates or minimizes the problems and disadvantages commonly associated with conventional methods used in attempting to bond aluminum fluidic laminae.

For example, compared to aluminum "cladding" and diffusion bonding, the present method is significantly less expensive—both from a time and materials standpoint. The very short heating holding time of from ten to twenty minutes represents a drastic bonding time reduction compared to the several hours typically required in either the cladding or diffusion bonding technique. Moreover, the necessity of using costly bonding materials (as in the aluminum cladding process) is eliminated.

Perhaps even more significantly, though, the method of the present invention also eliminates the previous problems of stack and internal passage distortion—problems which must be avoided to maintain the critical high degree of configurational accuracy necessary in fluidic devices of the type described. Since the bonding temperature utilized in the present invention (320° F.–350° F. in the case of indium solder, and 450° F.–500° F. in the case of tin solder) is well below the approximately 600° F. softening temperature of aluminum, warpage of either the stack or its internal passages is simply, inexpensively and completely avoided.

Also, since the solder medium is applied prior to the stacking and heating of the laminae, the thickness uniformities of the resulting bond joints (i.e., the fused solder layers) between adjacent laminae are automatically and very precisely controlled over the entire facing surfaces of the laminae. Such prior application of the bonding medium also effectively eliminates the potential problem of such medium's flow into (and blocking of) the internal fluidic passages, as would be the case if conventional sweat soldering of the stack was attempted.

On a more basic level, the present invention also effectively eliminates the previously encountered problem of soldering aluminum to aluminum—a problem arising from the difficulty of satisfactorily adhering conventional solder directly to aluminum surfaces. Due to the described zinc and nickel coatings sequentially applied to the aluminum surfaces, a surface (i.e., nickel) is provided which solder will satisfactorily adhere to.

Because of its weight and cost advantages compared to conventional stainless steel fluidic laminae, aluminum is the preferred laminate material upon which to perform the bonding method of the present invention. However, it has been found that the described bonding method can also be very advantageously utilized with other nonferrous metallic laminate material, such as titanium, when, for example, a higher material strength is desired.

As mentioned, the described aluminum fluidic device 10 is an angular rate sensor. The bonding method of the present invention, however, is equally suitable for the fabrication of a wide variety of other aluminum fluidic sensing and control devices such as amplifiers, oscillators, density sensors, switches and the like.

The foregoing detailed description is to be clearly understood as given by way of illustration and example only, the spirit and scope of this invention being limited solely by the appended claims.

What is claimed is:

1. A method of bonding a duality of aluminum or titanium metallic fluidic laminae each having a side surface, said method comprising the steps of:
    (a) coating each of the side surfaces with a layer of zinc;
    (b) coating each of the zinc layers with a layer of nickel;
    (c) coating each of the nickel layers with a layer of solder material;
    (d) positioning the solder material layers in intimate contact; and
    (e) fusing the contacting solder material layers by heating the coated laminae without appreciably softening the metallic fluidic laminae.

2. The method of claim 1 wherein said coating step (b) is performed by depositing nickel sulfamate on each of said side surfaces to a thickness of between approximately 0.00010 inch to approximately 0.00015 inch.

3. The method of claim 1 wherein said coating step (c) is performed by depositing indium on each of the nickel layers.

4. The method of claim 3 wherein said coating step (c) is performed by electrodepositing indium on each of the nickel layers to a thickness of between approximately 0.000030 inch and approximately 0.000060 inch.

5. The method of claim 1 wherein said coating step (c) is performed by depositing tin on each of the nickel layers.

6. The method of claim 5 wherein said coating step (c) is performed by electrodepositing tin on each of the nickel layers to a thickness of between approximately 0.000050 inch to approximately 0.000100 inch.

7. The method of claim 1 wherein said step (e) is performed by a fluxless soldering process.

8. An intersecured duality of nonferrous metallic laminae produced by the method of claim 1.

9. A method of manufacturing a fluidic device comprising the steps of:
    (a) providing a plurality of aluminum laminae each having a side surface;
    (b) zinc immersion coating said side surfaces;
    (c) nickel plating the zinc coating by depositing nickel sulfamate to a thickness of from approximately 0.00010 inch to approximately 0.00015 inch;
    (d) electrodepositing a layer of solder material on the nickel plating;
    (e) positioning the solder layers against one another; and
    (f) utilizing a fluxless solder process to fuse the solder layers to one another.

10. The method of claim 9 wherein said providing step (a) is performed by providing a plurality of aluminum laminae, and said electrodepositing step (d) is performed by electrodepositing a layer of indium on the nickel plating to a thickness of from approximately 0.000030 inch to approximately 0.000060 inch using an indium sulfamate solution and pure indium anodes.

11. The method of claim 10 wherein said utilizing step (f) includes heating the layers of indium to a temperature of between approximately 320° F. and approximately 350° F. for approximatley ten to twenty minutes.

12. The method of claim 9 wherein said providing step (a) is performed by providing a plurality of aluminum laminae, and said electrodepositing step (d) is performed by electrodepositing a layer of tin on the nickel plating to a thickness of from approximately 0.000050 inch to approximately 0.000100 inch.

13. The method of claim 12 wherein said utilizing step (f) includes heating the layers of tin to a temperature of between approximately 450° F. and approximately 500° F. for approximately ten to twenty minutes.

14. A fluidic device manufactured by the method of claim 9.

15. A method of manufacturing an aluminum fluidic device comprising the steps of:
 (a) providing a plurality of aluminum laminae, each having a side surface and a softening point temperature;
 (b) securing onto each of the side surfaces, a first layer containing zinc, a second layer containing nickel, and a third layer containing a metallic bonding material selected from the group of solders comprising tin or indium and having a melting point temperature significantly lower than said softening point temperature;
 (c) positioning said bonding material layers in intimate contact; and
 (d) fusing the contacting bonding material layers by heating them to a temperature below said softening point temperature.

16. The method of claim 15 wherein said securing step (b) is performed by sequentially coating each of said side surfaces with layers of zinc, nickel sulfamate and indium sulfamate.

17. The method of claim 15 wherein said securing step (b) is performed by sequentially coating each of said side surfaces with layers of zinc, nickel sulfamate and tin based solder.

18. An aluminum fluidic device manufactured by the method of claim 15.

19. A fluidic device comprising a plurality of titanium fluidic laminae having facing side surfaces to each of which are sequentially adhered a layer of zinc, a layer of nickel and a layer of solder, said layers of solder being fused to each other.

20. The fluidic device of claim 19 wherein said solder is indium.

21. The fluidic device of claim 19 wherein said solder is tin.

* * * * *